(12) United States Patent
Scheibert

(10) Patent No.: US 9,267,715 B2
(45) Date of Patent: Feb. 23, 2016

(54) ICING PROTECTION SYSTEM FOR AN AIRCRAFT AND METHOD FOR OPERATING AN ICING PROTECTION SYSTEM

(71) Applicant: Airbus Operations GmbH, Hamburg (DE)

(72) Inventor: Tobias Scheibert, Hamburg (DE)

(73) Assignee: Airbus Operations GmbH (DE)

( * ) Notice: Subject to any disclaimer, the term of this patent is extended or adjusted under 35 U.S.C. 154(b) by 391 days.

(21) Appl. No.: 13/754,027

(22) Filed: Jan. 30, 2013

(65) Prior Publication Data

US 2013/0199218 A1    Aug. 8, 2013

Related U.S. Application Data

(60) Provisional application No. 61/594,549, filed on Feb. 3, 2012.

(30) Foreign Application Priority Data

Feb. 3, 2012   (DE) .......................... 10 2012 002 132

(51) Int. Cl.
| | | |
|---|---|---|
| *F25B 41/00* | (2006.01) | |
| *F25B 21/04* | (2006.01) | |
| *H01M 8/04* | (2006.01) | |
| *B64D 15/04* | (2006.01) | |
| *B64D 15/02* | (2006.01) | |
| *B64D 15/06* | (2006.01) | |
| *B64D 41/00* | (2006.01) | |

(52) U.S. Cl.
CPC ............... *F25B 21/04* (2013.01); *B64D 15/04* (2013.01); *H01M 8/04059* (2013.01); *B64D 15/02* (2013.01); *B64D 15/06* (2013.01); *B64D 2041/005* (2013.01); *Y02T 90/36* (2013.01)

(58) Field of Classification Search
CPC ........ F25D 21/04; B64D 15/02; B64D 15/04; B64D 15/06
See application file for complete search history.

(56) References Cited

U.S. PATENT DOCUMENTS

| | | | |
|---|---|---|---|
| 5,947,418 A | 9/1999 | Bessiere et al. | |
| 5,971,323 A | 10/1999 | Rauch et al. | |

(Continued)

FOREIGN PATENT DOCUMENTS

| | | |
|---|---|---|
| CA | 2222469 A1 | 2/2006 |
| DE | 19935719 A1 | 2/2001 |

(Continued)

*Primary Examiner* — Mohammad M Ali
*Assistant Examiner* — Christopher R Zerphey
(74) *Attorney, Agent, or Firm* — Lerner, David, Littenberg, Krumholz & Mentlik, LLP

(57) ABSTRACT

An icing protection system comprises a fuel cell, an evaporative cooling system, a thermal deicing device, a control unit and a device for measuring the pressure in the evaporative cooling system. The evaporative cooling system is in thermal contact with the fuel cell and with the thermal deicing device in order to conduct heat from the fuel cell to the thermal deicing device. The control unit controls the electrical power demanded from the evaporatively cooled fuel cell in dependence on a deviation of the pressure measured by the pressure measuring device from a predetermined NOMINAL pressure. In this way, an energetically very efficient and very well controllable icing protection system is made available that can be operated without bleed air supplied by engines or electrical energy provided by engine generators.

13 Claims, 11 Drawing Sheets

(56) References Cited

U.S. PATENT DOCUMENTS

| | | |
|---|---|---|
| 6,467,730 B2 | 10/2002 | Laugt |
| 6,610,969 B2 | 8/2003 | Feher |
| 6,740,438 B1 | 5/2004 | Thom |
| 6,848,656 B2 | 2/2005 | Linton |
| 7,078,658 B2 | 7/2006 | Brunner et al. |
| 7,124,983 B2 | 10/2006 | Chow et al. |
| 7,157,663 B1 | 1/2007 | Kismarton |
| 7,523,889 B2 | 4/2009 | Bourjac et al. |
| 7,546,980 B2 | 6/2009 | Giamati |
| 7,556,221 B2 | 7/2009 | Hindel et al. |
| 7,913,952 B2 | 3/2011 | Boschet et al. |
| 7,954,753 B2 | 6/2011 | Hoffjann et al. |
| 2006/0237589 A1 | 10/2006 | Botura et al. |
| 2007/0045477 A1 | 3/2007 | Armstrong et al. |
| 2007/0112480 A1 | 5/2007 | Smith et al. |
| 2008/0105217 A1 | 5/2008 | Bourgault |
| 2008/0111028 A1 | 5/2008 | Kumar et al. |
| 2008/0258010 A1 | 10/2008 | Leon et al. |
| 2009/0072091 A1 | 3/2009 | Al-Khalil |
| 2009/0090814 A1 | 4/2009 | Barbara et al. |
| 2009/0224104 A1 | 9/2009 | Tenebre et al. |
| 2009/0230239 A1 | 9/2009 | Stothers |
| 2010/0071371 A1 | 3/2010 | Arendt et al. |
| 2011/0003224 A1 | 1/2011 | Scheibert |
| 2011/0031353 A1 | 2/2011 | Stolte et al. |
| 2011/0114895 A1 | 5/2011 | Lengsfeld |

FOREIGN PATENT DOCUMENTS

| | | |
|---|---|---|
| DE | 102005009349 A1 | 9/2005 |
| DE | 102004042423 A1 | 3/2006 |
| DE | 102004058430 A1 | 6/2006 |
| DE | 202007006212 U1 | 6/2007 |
| DE | 102006002882 A1 | 8/2007 |
| DE | 102007029842 A1 | 1/2008 |
| DE | 102007013345 A1 | 9/2008 |
| DE | 102007026246 A1 | 12/2008 |
| DE | 102007060428 B3 | 5/2009 |
| DE | 102008006523 A1 | 7/2009 |
| DE | 102008019146 A1 | 11/2009 |
| DE | 10 2010 011 416 A1 | 9/2011 |
| EP | 1017580 | 7/2000 |
| EP | 1116656 A1 | 7/2001 |
| EP | 1124721 A1 | 8/2001 |
| EP | 1204551 A2 | 5/2002 |
| EP | 1268274 A1 | 1/2003 |
| EP | 1541467 A1 | 6/2005 |
| EP | 1564142 A1 | 8/2005 |
| EP | 1593595 A2 | 11/2005 |
| EP | 1716044 A1 | 11/2006 |
| EP | 1739013 A1 | 1/2007 |
| EP | 1846293 | 10/2007 |
| EP | 1873060 A1 | 1/2008 |
| EP | 1911673 A1 | 4/2008 |
| EP | 1935783 A1 | 6/2008 |
| EP | 1973780 A1 | 10/2008 |
| EP | 2050673 A2 | 4/2009 |
| EP | 2225789 A1 | 9/2010 |
| GB | 2450503 A | 12/2008 |
| GB | 2450566 A | 12/2008 |
| GB | 2453769 A | 4/2009 |
| GB | 2453933 A | 4/2009 |
| GB | 2453934 A | 4/2009 |
| WO | 9915405 A1 | 4/1999 |
| WO | 0024634 A1 | 5/2000 |
| WO | 0108463 A2 | 2/2001 |
| WO | 0174661 A1 | 10/2001 |
| WO | 2005073084 A1 | 8/2005 |
| WO | 2005087589 A1 | 9/2005 |
| WO | 2006001830 A2 | 1/2006 |
| WO | 2006085054 A1 | 8/2006 |
| WO | 2007107731 A2 | 9/2007 |
| WO | 2007107732 A1 | 9/2007 |
| WO | 2007118263 A1 | 10/2007 |
| WO | 2007129907 A2 | 11/2007 |
| WO | 2007135383 A1 | 11/2007 |
| WO | 2007136260 A1 | 11/2007 |
| WO | 2008014912 A1 | 2/2008 |
| WO | 2009/077048 A1 | 6/2009 |
| WO | WO2009127652 * | 10/2009 ............ B64D 13/00 |

* cited by examiner

| | | | Surroundings (Ambience) | | | Non-pressurized region | | | Low-temperature PEM fuel cell Polyperfluoro sulphonic acid PEM fuel cell | | | | | | High-temperature PEM fuel cell | | | | | | | |
|---|---|---|---|---|---|---|---|---|---|---|---|---|---|---|---|---|---|---|---|---|---|---|
| | | | | | | | | | | | | | | | 1. High-temperature PEM fuel cell | | | | | | 2. Polybenzimidazole PEM fuel cell | | |
| | | | | Evaporation temperature Boiling point | | Pressure in belly fairing | Pressure on skin | | Evaporation temperature Boiling point | | NOMINAL operating temperature of the fuel cell | | | Evaporation temperature Boiling point | | NOMINAL operating temperature of the fuel cell | | | Evaporation temperature Boiling point | | NOMINAL operating temperature of the fuel cell | | |
| | Re | Altitude m | $p_A$ bar | T °C | | $p_1$ bar | $\Delta p_{Skin}$ $p_1$-$p_A$ bar | | $p_2$ bar | T °C | $T_{BZ}$ °C | $\Delta p_3$ $p_2$-$p_1$ bar | $\Delta p_{ges}$ $p_2$-$p_A$ bar | $p_2$ bar | T °C | $T_{BZ}$ °C | $\Delta p_3$ $p_2$-$p_1$ bar | $\Delta p_{ges}$ $p_2$-$p_A$ bar | $p_2$ bar | T °C | $T_{BZ}$ °C | $\Delta p_3$ $p_2$-$p_1$ bar | $\Delta p_{ges}$ $p_2$-$p_A$ bar |
| Flight | turb. | 2500 | 0,2 | 60,09 | | 0,3 | 0,1 | | 0,3 | 69,12 | 72 | 0 | 0,1 | 1,3 | 107,13 | 110 | 1 | 1,1 | 6 | 158,84 | 162 | 5,7 | 5,8 |
| | turb. | 500 | 1 | 99,63 | | 1,1 | 0,1 | | 1,1 | 102,32 | 105 | 0 | 0,1 | 1,3 | 107,13 | 110 | 0,2 | 0,3 | 6 | 158,84 | 162 | 4,9 | 5 |
| Ground | lam. | 0 | 1 | 99,63 | | 1,1 | 0,1 | | 1,1 | 102,32 | 105 | 0 | 0,1 | 1,3 | 107,13 | 110 | 0,2 | 0,3 | 6 | 158,84 | 162 | 4,9 | 5 |

Fig. 2

| | | Surroundings (Ambiance) | | | Non-pressurized region | | Evaporative cooling system | | Low-temperature PEM fuel cell / Polyperfluoro sulphonic acid PEM fuel cell | | | |
|---|---|---|---|---|---|---|---|---|---|---|---|---|
| | | | | Evaporation temperature Boiling point | | Pressure in belly fairing | Pressure on skin | | Evaporation temperature Boiling point | Fuel cell system NOMINAL | | |
| | | | | | | | | | | Fuel cell operating temperature | Fuel cell operating pressure | Evaporation temperature Boiling point |
| Air flow | Characteristic Reynolds number Re | Altitude m | Pabsolute PA bar | T °C | Pabsolute P1 bar | ΔPSkin P1-PA bar | Pabsolute P2 bar | T °C | | $T_{BZ}$ °C | Pabsolute $P_{BZ}^*$ bar | Process water T °C |
| Flight | turbulent | 12500 | 0,2 | 60,09 | 0,3 | 0,1 | 0,3 | 69,12 | | 72 | 0,6 | 85,95 |
| | turbulent | 500 | 1 | 99,63 | 1,1 | 0,1 | 1,1 | 102,32 | | 105 | 2 | 120,23 |
| Ground | laminar | 0 | 1 | 99,63 | 1,1 | 0,1 | 1,1 | 102,32 | | 105 | 2 | 120,23 |

Fig. 3

| Boiling temperature [°C] | Boiling pressure [bar] | Flight altitude [m] | Wet steam spec. volume [m³/kg] | Condensation water spec. volume [m³/kg] | Condensation water volume fraction [-] |
|---|---|---|---|---|---|
| 60 | 0,1992 | 12192 (40000 feet) | 7,682 | 0,0010172 | 0,0001 |
| 70 | 0,3116 | 9144 (30000 feet) | 5,048 | 0,0010229 | 0,0002 |
| 80 | 0,4736 | 6096 (20000 feet) | 3,410 | 0,0010293 | 0,0003 |
| 90 | 0,7011 | 3048 (10000 feet) | 2,361 | 0,0010363 | 0,0004 |
| 100 | 1,0132 | 0 | 1,673 | 0,0010438 | 0,0006 |

Fig. 10

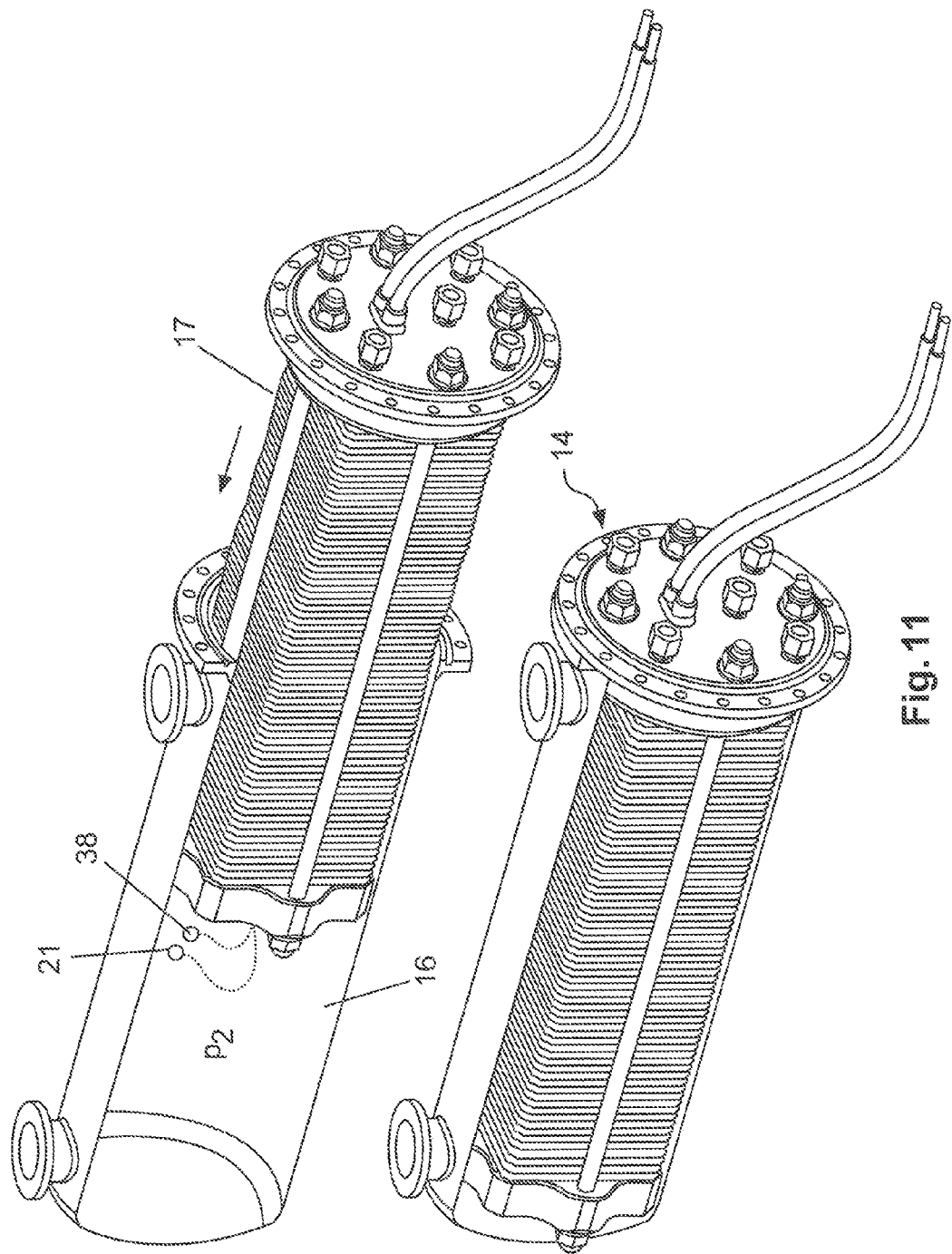

ICING PROTECTION SYSTEM FOR AN AIRCRAFT AND METHOD FOR OPERATING AN ICING PROTECTION SYSTEM

REFERENCE TO RELATED APPLICATIONS

This application claims the benefit of the filing date of German Patent Application No. 10 2012 002 132.1 filed Feb. 3, 2012 and of U.S. Provisional Patent Application No. 61/594,549 filed Feb. 3, 2012, the disclosure of which applications is hereby incorporated herein by reference.

TECHNICAL FIELD

The invention pertains to an icing protection system for an aircraft and a method for operating an icing protection system of an aircraft.

BACKGROUND OF THE INVENTION

It is known to carry out the deicing of surfaces prone to icing with the aid of heated air that originates, for example, from main engines or from an auxiliary power unit (Auxiliary Power Unit, APU) and is usually routed through a deicing valve, a throttling element and a piccolo tube that is respectively situated in the interior of the wing nose or slats (slats). The hot engine bleed air escapes through the openings of the piccolo tube and flows directly along an underside or inner side of a surface prone to icing, to which it transfers part of its thermal energy. Due to the high energy content of the hot bleed air obtained from the main engines, an internal wing deicing system of an aircraft realized in accordance with the prior art can only be utilized in-flight because material overheating of the wing structure may easily occur on the ground due to the lack of relative wind.

EP 1 935 783 B1 and EP 1 116 656 B1 disclose thermal deicing devices and methods by means of hot air. US 20080105217 A1 discloses a thermal deicing system that operates with water-saturated, heated air while U.S. Pat. No. 6,848,656 B2 proposes to remove molten ice with an air current acting thereupon. DE 10 2008 019 146 A1 proposes to heat air that originates, for example, from a passenger cabin by means of a fuel cell and to route this heated air into regions of the aircraft to be deiced. DE 10 2006 002 882 B4 and DE 10 2004 058 430 B4 mention the thermal wing deicing by means of the waste air flow from a fuel cell or fuel cell waste gas, respectively. With respect to an evaporatively cooled fuel cell system, EP 2 225 789 B1 describes the advantages of the heat transfer by means of a change in state of aggregation in comparison with the heat transfer by means of hot air. EP 1 973 780 B1 proposes to counteract material damages due to overheating by improving the heat transmission due to an increase of the air turbulence on the wing nose. EP 1 793 013 B1 proposes to prevent material overheating by means of a mixing chamber.

Despite the high energy content of the bleed air obtained, for example, from main engines, the heat transfer is limited by the comparatively low heat transfer coefficient of air such that the deicing still cannot always be precisely controlled and is predominantly ensured by excess bleed air. In this case, excess bleed air that contains energy irreversibly escapes into the surroundings together with part of the energy generated by means of fuel.

In the development of modern commercial aircraft, there is a general trend to realize ecologically responsible solutions for minimizing the environmental consequences of industrial processes and products over their entire life cycle and to further reduce the costs. Future aircraft should be more economical, quieter and cleaner than today's commercial aircraft.

SUMMARY OF THE INVENTION

It is the object of the invention to diminish or to entirely eliminate the above-described disadvantages.

In particular, it is the object of the invention to propose an icing protection system for an aircraft that is efficient, has a particularly low fuel consumption and therefore makes it possible significantly increase the range of the aircraft in comparison with conventional icing protection systems.

Another object of the invention can be seen in improving the quality and reliability of icing protection.

It is a further object of the invention to disclose a method for operating an icing protection system of an aircraft.

The above-defined object is met by an icing protection system with the features of independent claim 1. Advantageous improvements are disclosed in the depending claims.

In the present invention, the waste heat of a fuel cell system is used for the thermal deicing of an aircraft and electrical energy is secondarily generated. With an overall efficiency of over 80%, such an icing protection system is particularly well suited for use in an aircraft. In other words: the thermal deicing carried out with the present icing protection system takes place while electricity is released.

An embodiment of the icing protection system according to the invention comprises a fuel cell, an evaporative cooling system, a thermal deicing device with a condenser and steam conduits for supplying steam into the condenser, a control unit and a device for measuring the pressure in the steam conduits, wherein the evaporative cooling system is in thermal contact with the fuel cell in order to conduct heat from the fuel cell to the evaporative cooling system for the evaporation of a cooling medium and to route the evaporated cooling medium to the condenser via the steam conduits, wherein the condenser is designed for causing a condensation of the cooling medium evaporated during the operation of the fuel cell in order to cool the fuel cell while simultaneously emitting heat in the region to be deiced, and wherein the control unit is designed for controlling the electrical power demanded from the evaporatively cooled fuel cell in dependence on a deviation of the pressure measured with the pressure measuring device from a predetermined nominal pressure in such a way that the thermal cooling capacity of the evaporative cooling system of the evaporatively cooled fuel cell corresponds to the condensation capacity of the thermal deicing device.

In this context, a "thermal deicing device" particularly refers, but is not exclusively limited, to a thermal wing deicing device for the icing protection of the wing nose. The thermal deicing device may likewise serve for the thermal icing protection of the tail unit or other aircraft components.

According to a positive aspect of the icing protection system according to the invention, no additional energy is consumed for heating purposes, but already existing waste heat to be disposed from the aircraft rather is intelligently utilized. It takes advantage of a combination of thermal deicing device and evaporatively cooled fuel cell system: the evaporatively cooled fuel cell system is cooled while the thermal deicing device is heated. Instead of consuming electrical energy for the deicing, the icing protection system according to the invention generates electrical energy during the wing deicing. It utilizes low-value waste heat from the evaporatively cooled fuel cell system for the wing deicing while the fuel cell system generates high-value power. The electrical power "incurred"

during the wing deicing can be fed to an electrical storage system or consumer, respectively.

Fuel cells generate power, water and heat by means of a chemical conversion of the hydrogenous fuel used. The term "fuel cell" should at this point not necessarily be interpreted as one individual fuel cell, but may also be representative of a plurality of fuel cells, as well as one or more fuel cell stacks.

The control unit of the icing protection system according to the invention controls the evaporatively cooled fuel cell system in such a way that the heat consumed on the thermal deicing device is always resupplied by the evaporatively cooled fuel cell system while the power generation plays a rather secondary role.

The evaporatively cooled fuel cell system exclusively serves for providing the thermal deicing device with the required heat. Electrical energy is incurred as a byproduct and available to other consumers. During the fuel cell reaction, the fuel cell carries out a direct conversion of the chemical energy of the fuel used into thermal energy (~55%) and electrical energy (~45%). This direct conversion results in an exceptionally high efficiency of the overall system. The present invention aims, in particular, to achieve an effective utilization of the first-mentioned 55% of thermal energy.

The evaporative cooling system for the fuel cell comprises one or more closed conduits that are at least partially filled with a suitable vaporizable and condensable cooling medium, e.g. water. When heat is introduced in the region of the fuel cell that serves as heat source, the cooling medium is heated within these conduits such that it evaporates and respectively spread outs or expands within the evaporative cooling system and is respectively routed to the regions to be deiced or to the thermal deicing device in the form of a heat transfer medium via the steam conduits or to a wall on a wing. The condenser of the thermal deicing device may be advantageously realized, in particular, in the form of a wing nose or a slat that respectively comprises a cavity for accommodating the steam. During the condensation of the steam at a heat sink in the form of the thermal deicing device, the molecules collapse to a fraction of their original volume while simultaneously emitting heat, wherein this would in the closed space of the evaporative cooling system cause a vacuum manifesting itself in a pressure change that may be clearly measured with the pressure measuring device. In order to prevent significant pressure changes due to evaporation at the heat source, the control unit is now able to cause the introduction of new steam molecules into the closed space of the evaporative cooling system. A predetermined NOMINAL pressure within the evaporative cooling system may be maintained, for example, by adjusting a corresponding electrical drain current, on which the heat development in the fuel cell and therefore the generation of water vapor within the evaporative cooling system depend, at the fuel cell.

The generation of heat by means of the fuel cell only is ensured because the demanded electrical power is controlled in such a way that the thermal cooling capacity of the evaporative cooling system corresponds to the heat demand of the thermal deicing device.

The thermal deicing device according to the invention is characterized by a significantly higher heat transfer coefficient than known deicing devices. It can be precisely controlled with the above-described control unit and only requests exactly the quantity of heat that it currently requires for a deicing process such as, for example, wing deicing from a heat generator. Although the thermal deicing process can be carried out at a significantly lower temperature level, for example, of 60° C. with the aid of the device according to the invention, the same quantity of heat as with conventional systems based on bleed air can be transferred due to the higher heat transfer coefficient. The comparatively low temperature makes it possible to treat the material to be deiced with care and to extend its service life.

The evaporatively cooled fuel cell system is preferably designed in such a way that it is always able to provide the thermal output required for the wing deicing. In this context, an evaporatively cooled fuel cell system with an electrical power of 100 kW may represent an appropriate size for an aircraft.

In an advantageous embodiment of the invention, the fuel cell of the icing protection system according to the invention may alternatively or additionally serve as heat source for other heat-consuming systems such as, for example, one or more decentralized adsorption cooling systems, e.g., based on zeolite when the heat demand of the thermal deicing device is reduced due to environmental conditions. If so required, however, the evaporatively cooled fuel cell system can always be used for the generation of emergency power.

In an advantageous embodiment of the icing protection system according to the invention, the evaporative cooling system comprises an additional aftercondenser that is arranged downstream of the deicing device and serves for the further condensation of the remaining non-condensed cooling medium vapor of the cooling medium evaporated during the operation of the fuel cell in order to cool the fuel cell in the regions to be deiced. This additional downstream condenser may be formed by regions of the aircraft skin such as, for example, by regions of a wing-fuselage fairing (also referred to as "belly fairing"). The heating principle according to the invention is comparable to that of the industrially proven vent condenser.

In an advantageous embodiment of the icing protection system according to the invention, the condenser is formed by at least one section of a wing nose such that the generated steam of the cooling medium can be directly introduced at the required location of a region to be deiced.

In an exemplary embodiment, an electrical energy storage device is provided for intermediately storing the electrical energy generated by the fuel cell.

In an advantageous embodiment of the icing protection system according to the invention, an electrical icing protection device is additionally provided and designed for receiving electricity generated by the fuel cell system. In this way, the fuel cell system is able to deliver two types of energy to the icing protection system in order to achieve an even more efficient utilization of the fuel: electrical energy and thermal energy. The deicing of wings and other large-surface devices with the aid of heat generated by an evaporated cooling medium is energetically much more favorable than an electrical deicing process. However, the deicing of smaller, filigree or hard-to-reach regions or components such as, for example, instruments and measuring devices can be carried out much easier with an electrical deicing device such that a combined - but locally separated - utilization of heat and electrical energy for icing protection purposes is achieved with the aid of the icing protection system according to the invention.

In an exemplary embodiment, the fuel cell is realized in the form of a proton exchange membrane fuel cell (Proton Exchange Membrane, PEM), the anode region of which is connected to a hydrogen source and the cathode side of which is supplied with an oxygenous oxidizing agent, preferably air.

In an advantageous embodiment of the icing protection system according to the invention, the electrical output of the electrical deicing device correlates with the thermal output of the thermal deicing device such that the energy generated by the fuel cell is almost completely utilized.

In an advantageous embodiment of an icing protection system according to the invention, water is used as cooling medium. Water is environmentally friendly and easily refillable.

An advantageous embodiment of the icing protection system according to the invention comprises a closable air inlet, which is connected to the steam conduits in order to selectively flush the steam conduits and remove steam such that the risk of freezing water can be avoided when the icing protection system is switched off.

According to an advantageous embodiment, the air inlet is connected to a bleed air conduit of an engine such that largely dry air is used for flushing out the water vapor.

In an advantageous embodiment, the icing protection system is designed for supplying other heat consumers with heat on demand, wherein the heat consumers may be realized, for example, in the form of heat accumulators.

In an advantageous embodiment, temperature sensors are integrated into the steam conduits in order to prevent a permissible temperature from being exceeded in a timely fashion or to maintain a desired temperature level.

The substitution of a purely electric icing protection system with the present icing protection system controlled in accordance with the invention results in significant savings of electrical energy to be generated by an engine generator. An icing protection system equipped with an evaporatively cooled fuel cell system, for example, of 100 $kW_{el}$ may have the double effect of not only saving electrical energy for the wing deicing, but furthermore of being able to generate electrical energy on the order of the saved electrical energy. With respect to the overall energy balance, the available electrical power may be increased by 200 kW. This may correspond, e.g., to the power demand of an electrical aircraft air-conditioning system during a flight.

The icing protection system controlled according to the invention prevents icing of a wing that impairs the flying characteristics at all times. Consequently, the present invention actually concerns anti-icing because the formation of ice is prevented in the first place. Ice detection devices of any type are not required for the function of the thermal deicing device and merely serve as additional safety. The safety is also favorably affected by the enormous power reserve provided by an evaporatively cooled fuel cell, particularly for thermal icing protection. If the electrical power is during the operation of the evaporatively cooled fuel cell increased beyond its nominal power to its maximum power, the thermal output of the fuel cell can be tripled in this way (as elucidated further below with reference to FIG. 8). The thermal output can be even further increased by additionally increasing the load current. This may be useful in the case of extremely cold conditions.

It also is the object of the invention to purposefully bring together the remote regions of heat supply and heat demand occurring in the aircraft.

The invention furthermore relates to a method for operating an icing protection system, as well as an aircraft with an icing protection system.

A method for operating an icing protection system with a fuel cell according to the invention, an evaporative cooling system and a thermal deicing device with a condenser, in which the evaporative cooling system is in thermal contact with the fuel cell in order to conduct heat from the fuel cell to the evaporative cooling system for the evaporation of a cooling medium and to route the evaporated cooling medium to the condenser via the steam conduits, and in which the condenser is designed for causing a condensation of the cooling medium evaporated during the operation of the fuel cell in order to cool the fuel cell while simultaneously emitting heat in the region to be deiced, may essentially comprise the following steps. Measuring the pressure in steam conduits used for supplying steam into regions to be deiced by means of a pressure measuring device and controlling the demanded electrical power of the fuel cell by means of a control unit, wherein said control comprises adjusting the electrical power demanded from the evaporatively cooled fuel cell in dependence on a deviation of the pressure measured with the pressure measuring device from a predetermined nominal pressure, and wherein the electrical power demanded from the fuel cell is controlled in such a way that the thermal cooling capacity of the evaporative cooling system of the evaporatively cooled fuel cell corresponds to the condensation capacity of the thermal deicing device.

During a flight of an aircraft equipped with the icing protection system according to the invention, the thermal deicing device should be controlled by the control unit in such a way that a surface temperature, for example, of 60° C. is adjusted on the surfaces to be deiced. This allows a complete evaporation of the water thawed on the surfaces by the icing protection system. This is advantageous because water that has just thawed, but is not completely removed may refreeze on non-heated surfaces situated further toward the rear and once again accumulate into ice formations. The complete evaporation of thawed water represents one of the options for removing thaw water, in which it is mixed with the ambient air in the gaseous phase and transported away with the air flow. The thermal heating principle of the wing deicing according to the invention is based on condensation and due to the enormously high heat transmission on the wall provides a sufficiently high heat flow for thawing ice and for realizing a complete evaporation of the thaw water within the entire operating range of an aircraft.

During a flight, the operating pressure of the heat-supplying fuel cell is preferably adjusted to 0.6 bar in order to achieve an efficient operation (see also the following description of FIG. 3).

In an advantageous embodiment, excess electrical energy incurred is intermediately stored in a storage system. It is furthermore advantageous to intermediately store excess thermal energy incurred in a heat accumulator system, e.g., of an adsorption cooling system. In an emergency situation, it is furthermore preferred to supply the evaporative cooling system of the evaporatively cooled fuel cell with cooling fluid from a different fluid tank for the purpose of generating emergency power and wing deicing. This fluid tank may form part of a heat accumulator system.

BRIEF DESCRIPTION OF THE DRAWINGS

Other characteristics, advantages and potential applications of the present invention result from the following description of the exemplary embodiments and the figures. In this respect, all described and/or graphically illustrated characteristics also form the object of the invention individually and in arbitrary combination regardless of their composition in the individual claims or their references to other claims. In the figures, identical or similar objects are furthermore identified by the same reference symbols.

FIG. 2 tabularly shows a comparison of the pressures in an evaporative cooling system of PEM fuel cells that are evaporatively cooled with water.

FIG. 3 shows the pressure in a fuel cell system of PEM fuel cells that are evaporatively cooled with water in the form of a table.

FIG. 10 tabularly shows the volume fraction of condensing water in comparison with saturated steam in dependence on the flight altitude.

FIG. 11 shows an exemplary embodiment of an evaporatively cooled fuel cell in the form of a partial section.

DETAILED DESCRIPTION OF EXEMPLARY EMBODIMENTS

Figure 1:
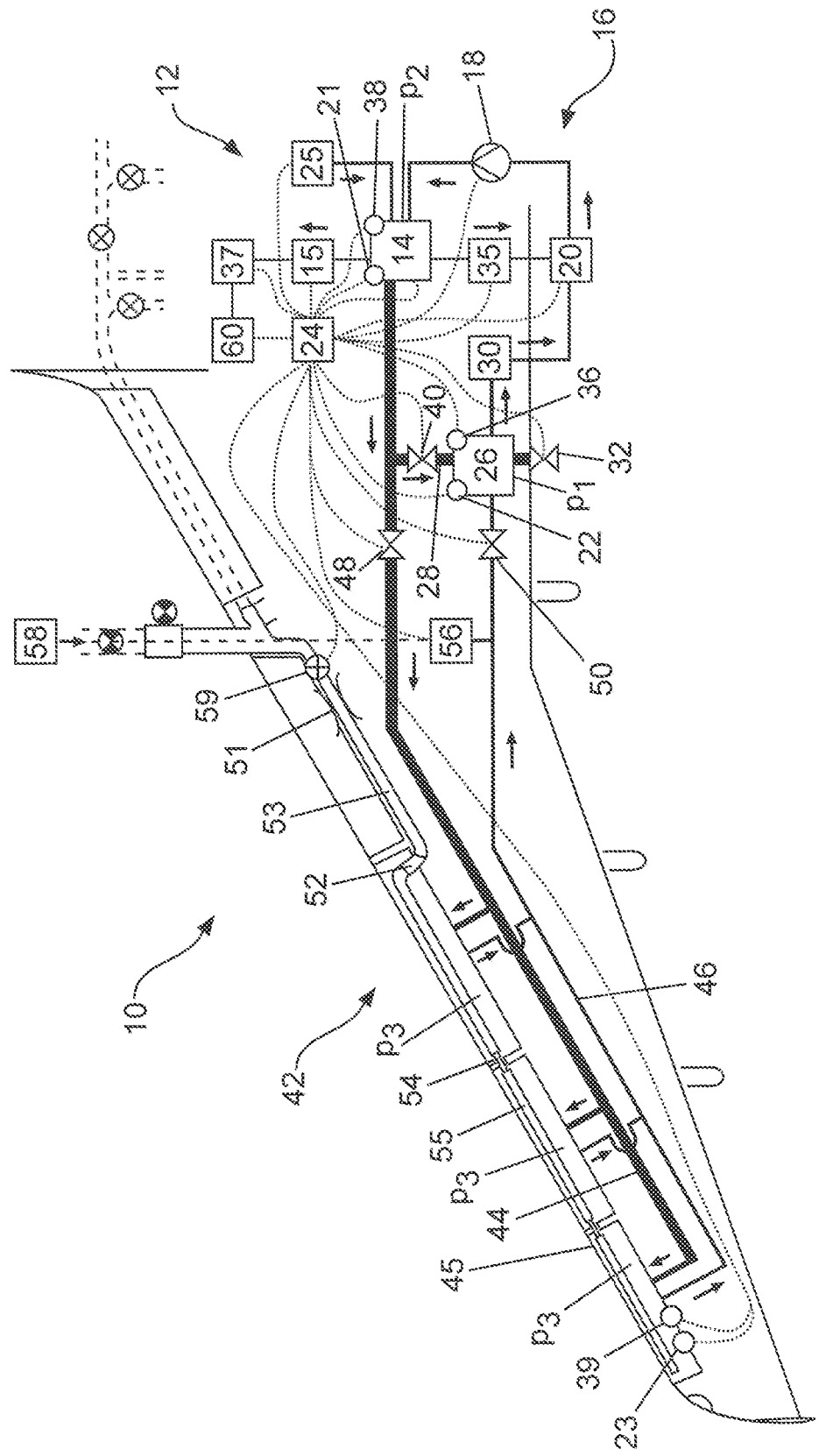
FIG. 1 shows a schematic representation of an icing protection system according to the invention.

FIG. 1 shows an icing protection system 10 according to the invention in an aircraft. It contains an evaporatively cooled fuel cell system 12 that is preferably arranged in a non-pressurized region of the aircraft such as, for example, in a fairing of a wing-fuselage transition (also referred to as "belly fairing"). The fuel cell system 12 comprises a fuel cell 14 that is realized in the form of a fuel cell stack in the described example. The fuel cell 14 may be realized in the form of a low-temperature PEM fuel cell with an operating temperature range between 60° C. and 110° C., as well as in the form of a high-temperature PEM fuel cell with operating temperatures in excess of 200° C.

The evaporatively cooled fuel cell system 12 contains a fuel cell 14 and an evaporative cooling system 16 that is in thermal contact with the fuel cell 14 in order to absorb and remove from the fuel cell 14 heat generated by the fuel cell 14 during the operation of the fuel cell 14 by evaporating a cooling medium that flows out of a steam outlet conduit 28 comprising, for example, a valve 40. In the embodiment shown, the evaporative cooling system 16 comprises a device 22 for measuring the pressure in the evaporative cooling system 16, as well as a control unit 24 that is designed for controlling the operating temperature of the fuel cell 14 in dependence on signals fed to the control unit 24 by the device 22 for measuring the pressure in the evaporative cooling system 16 in such a way that the cooling medium of the evaporative cooling system 16 is transferred from the liquid into the gaseous state of aggregation by the heat generated during the operation of the fuel cell 14. This takes place within cooling conduits 17 provided on the fuel cell 14, preferably in the wet steam area of the cooling medium.

In addition, temperature sensors 21 are furthermore arranged in the steam conduits 44, 46 in order to measure the temperature such that an impending temperature exceedance can be sensed and limited by controlling the fuel cell 14 accordingly. This alternatively or additionally also makes it possible to sense and maintain an operating temperature in the steam conduits 44, 46.

The icing protection system 10 according to the invention furthermore contains a thermal deicing device 42 that is in thermal contact with the evaporative cooling system 16 and equipped with steam conduits 44, 46 and a region of the wing nose realized, for example, in the form of a slat 45, wherein this thermal deicing device receives a thermal output $Q^{\cdot}_{zu}$ in the form of steam from the evaporative cooling system 16 of the evaporatively cooled fuel cell 14 while condensation takes place.

The thermal deicing device 42 comprises a device 23 for measuring the pressure in the steam conduits 44, 46 of the thermal deicing device 42, as well as the already mentioned control unit 24 that is not only designed for controlling the operating temperature of the fuel cell, but among other things also for controlling the electrical power $P_{BZ}$ demanded from the evaporatively cooled fuel cell 14 in dependence on signals fed to the control unit 24 by the device 23 for measuring the pressure in the steam conduits 44, 46 and the region of the slat 45 of the thermal deicing device 42 in such a way that the thermal cooling capacity $Q^{\cdot}_{zu}$ of the evaporative cooling system 16 of the evaporatively cooled fuel cell 14 can be controlled in dependence on the condensation capacity $Q^{\cdot}_{ab}$ in the steam conduits 44, 46 and in the slat 45 of the thermal deicing device 42.

The control by means of the pressure measured by the pressure measuring device 23 takes into account the adaptation of the steam supply in dependence on the condensation process in the thermal deicing device 42. This is the reason why the pressure measuring device 23 is arranged in the thermal deicing device 42. The control by means of the pressure measuring device 22 takes into account the presence of non-condensed steam after it flows through the thermal deicing device 42 such that a separate aftercondenser 26 may be additionally acted upon with this steam. In an advantageous embodiment of the invention, the aftercondenser 26 may be formed by surfaces of the aircraft skin, for example, in the region of the wing-fuselage fairing. In this way, a significant heat flow may be discharged into the surroundings efficiently and without additional weight and a subsequent condensation of the still remaining steam therefore may be realized. Water vapor furthermore can be discharged from the system by means of a steam release valve 32 in order to briefly lower the pressure or in case the heat withdrawal is temporarily impaired. To this end, temperature measuring devices 36 may be arranged on the aftercondenser 26, 38 on the fuel cell 14 or 39 on the slat 45 and connected to the control unit 24.

The evaporatively cooled fuel cell system 12 furthermore comprises a storage system 37 for storing electrical energy generated during the operation of the fuel cell 14. The storage system 37 serves for intermediately storing excess electrical energy generated by the fuel cell 14 and for delivering the intermediately stored electrical energy on demand to consumers aboard the aircraft that are supplied with electrical energy by the evaporatively cooled fuel cell system 12. The storage system 37 may comprise, for example, a supercapacitor or several supercapacitors or alternatively other electrical storage units.

If an on-board power generating system fails, the icing protection system 10 according to the invention may, in principle, also be used for generating emergency power. It contains a cooling medium tank 20 with liquid cooling medium that is designed for supplying a cooling medium pump 18 of the evaporative cooling system 16 with cooling medium. It goes without saying that this cooling medium pump 18 can also be controlled by the control unit 24 or by another control unit that is connected to the control unit 24. Accumulating water from the region of the fuel cell 14 can be fed to the tank 20 by means of a process water withdrawal device 35. For example, a condensate diverter 30 is provided as a device for removing all accumulating condensate from a single location and for this purpose arranged upstream of the cooling medium tank 20.

In order to generate emergency power, the cooling medium tank 20 of the evaporatively cooled fuel cell system 12 contained in the icing protection system 10 according to the invention may in addition to its basic function as a cooling fluid reservoir also fulfill the additional function of a potential spare tank. For emergencies, the cooling medium tank 20 may always contain a spare cooling capacity QBZ for the emergency power supply of an aircraft in accordance with the following equation:

$$Q_{BZ}=m \cdot \Delta h_v,$$

wherein $\Delta h_v$ is the evaporation enthalpy of the cooling medium and m is the mass of the cooling medium. The product of these two variables embodies the remaining cooling capacity $Q_{BZ}$ available to the fuel cell 14. It should be particularly emphasized, however, that the cooling capacity $Q_{BZ}$ is in this stored form independent of environmental influences and available under any environmental conditions because the cooling principle of the evaporatively cooled fuel cell system 12 is not based on recooling by means of ambient air.

The remaining average cooling capacity $\dot{Q}_{BZ}$ that is always available to the fuel cell 14 may be determined in accordance with the following equation:

$$\dot{Q}_{BZ} = Q_{BZ}/\Delta t,$$

wherein $\Delta t$ may, for example, be a remaining flight time ($t_{arrival}-t_{current}$) until the landing. $\dot{Q}_{BZ}$ therefore corresponds to a guaranteed average minimum cooling capacity that in an emergency is available to the fuel cell system 12 in order to generate emergency power for the power supply of flight-relevant systems.

In an advantageous embodiment of the invention, the evaporatively cooled fuel cell system 12 contained in the icing protection system 10 according to the invention may for the purpose of emergency power generation not only access the cooling medium tank 20, but also a cooling fluid from an external tank such as, for example, the heat accumulator of an adsorption cooling system. Such a heat accumulator in turn may during normal flying operations be continuously supplied with heat from the evaporatively cooled fuel cell system 12 that is required, for example, for the desorption cycle of an adsorption cooling system. The capacitive property of such a heat accumulator may also be useful for the control of the evaporatively cooled fuel cell system 12.

The icing protection system 10 according to the invention may contain several spaces such as, for example, three spaces with respective pressures $p_1$, $p_2$ and $p_3$ acting therein, as well as the ambient pressure $p_A$ that predominates in the surroundings of the aircraft. A pressure $p_1$ acts in an evaporative cooling system 16 of an evaporatively cooled fuel cell system 12 that is situated, for example, in the belly fairing. A pressure $p_2$ acts in the cooling conduits 17 of the fuel cell 14. A pressure $p_3$ may act in steam conduits 44, 46 contained in a thermal deicing device 42, as well as a slat 45. The following correlation basically applies in this respect:

$$p_2 \geq p_3 \geq p_1 \geq p_A.$$

While the ambient pressure $p_A$ surrounding the aircraft amounts to approximately 1 bar at sea level, the ambient pressure $p_A$ while cruising at an altitude of 12,500 m amounts to approximately 0.2 bar. The NOMINAL pressure $p_2$ predominating in the cooling conduits 17 of the fuel cell 14 of the evaporatively cooled fuel cell system 12 is adjusted in dependence on the NOMINAL operating temperatures $T_{BZ}$ of the fuel cell 14 indicated in FIG. 2. The NOMINAL pressure $p_2$ is fed to the described control unit 24 in order to adapt the electrical power to the heat demand of the thermal deicing device 42.

In order to flush the slat 45 to be deiced, the icing protection system 10 comprises engine bleed air conduits 53 with, among other things, a telescopic tube 52 and a flexible tube connection 54 that are connected to an engine bleed air valve 59 and a throttling element 51. The icing protection system 10 may furthermore comprise one or more of water vapor supply systems 56, by means of which water vapor can be routed into the exhaust gas jet of an aircraft engine 58, e.g., through Venturi tubes. This makes it possible to reduce the emission of pollutants.

The table in FIG. 2 shows the ambient pressure $p_A$, for example, in dependence on the flow condition (laminar or turbulent) and the flight altitude, a NOMINAL pressure $p_1$ to be predetermined and the NOMINAL pressures $p_2$ to be respectively predetermined for the NOMINAL operating temperatures $T_{BZ}$ of the fuel cell 14 in the evaporative cooling system 16 for three different fuel cell types, as well as the pressure differentials $\Delta p_{Skin}$, $\Delta p_3$ and $\Delta p_{ges}$, in a water-fed evaporative cooling system 16 of an evaporatively cooled fuel cell system 12. Since the boiling temperatures that can be assigned to the NOMINAL pressures $p_2$ respectively lie below the NOMINAL operating temperatures of the fuel cell 14, the desired evaporation of the cooling medium contained in the evaporative cooling system 16 that causes the cooling of the fuel cell 14 always takes place.

In the table illustrated in FIG. 3, the NOMINAL fuel cell operating temperatures $T_{BZ}$ for a low-temperature PEM fuel cell system are illustrated in dependence on the flow condition (laminar/turbulent) and the altitude together with a preferably adjusted fuel cell operating pressure $p_{BZ*}$ that, according to the invention, is adjusted by a system 25 for generating fuel cell operating pressure illustrated in FIG. 1. During the electrochemical conversion process in a low-temperature PEM fuel cell, water is created from hydrogen and oxygen while electrical energy and heat are released. The system 25 for generating fuel cell operating pressure is able to adjust the pressure $p_{BZ}^*$ within the fuel cell in such a way that an undesirable evaporation of process water accumulating within the fuel cell during the fuel cell reaction is prevented. In contrast to the pressure $p_{BZ}$ in the evaporative cooling system of the fuel cell, $p_{BZ*}$ is the operating pressure directly in the fuel cell 14, with which the fuel cell reaction takes place at the corresponding fuel cell operating temperature $T_{BZ}$.

According to the table illustrated in FIG. 3, a low-temperature PEM fuel cell system can preferably be operated with a fuel cell operating pressure $p_{BZ*}$ of 0.6 bar absolute while flying at cruising altitude. While the fuel cell operating temperature $T_{BZ}$ amounts to 72° C., the process water accumulating due to the fuel cell reaction would only evaporate at a temperature of 85.95° C. This temperature would then correspond to the boiling point of water at 0.6 bar.

The operation of a low-temperature PEM fuel cell system at cruising altitude with a low fuel cell operating pressure $p_{BZ*}$ of 0.6 bar may be advantageous in comparison with the fuel cell operation under normal conditions, e.g., with a fuel cell operating pressure $p_{BZ*}$ of 1.5 bar absolute. Despite adequate performance characteristics of the fuel cell system, the effort for the oxidation medium supply can be significantly reduced in a fuel cell system supplied with ambient air such that the system efficiency is further improved.

According to the table illustrated in FIG. 2, a low-temperature PEM fuel cell 14 is preferably operated with a NOMINAL operating temperature of $T_{BZ}=72°$ C. For the operation of a water-fed, evaporatively cooled fuel cell system 12 at sea level, the NOMINAL operating temperature $T_{BZ}$ can be increased up to 105° C. in this case.

According to the table illustrated in FIG. 2, a first high-temperature PEM fuel cell 14 is operated, for example, with a NOMINAL operating temperature of constant $T_{BZ}=110°$ C.

According to the table in FIG. 2, a second high-temperature PEM fuel cell 14 is operated, for example, with a NOMINAL operating temperature of constant $T_{BZ}=162°$ C.

The beginning and the end of the steam conduits 44, 46 of the thermal deicing device 42 that are connected to the slat 45 are defined by pressure control valves 48 and 50.

According to $p_2 \geq p_3 \geq p_1 \geq p_4$, the absolute pressure $p_3$ in the steam conduits 44, 46 and the slat 45 of the thermal deicing device 42 may lie anywhere between the pressure $p_1$ in the belly fairing and the pressure $p_2$ in the cooling conduits 17 of the evaporatively cooled fuel cell 14 depending on the position of the pressure control valves. In the steam conduits 44, 46, as well as in the slat 45 of the thermal deicing device 42, the pressure therefore can be varied by $\Delta p_3 = p_2 - p_1$ with the aid of the pressure control valves 48 and 50. Consequently, the pressure-dependent heat transfer in the steam conduits 44, 46 and the slat 45 of the thermal deicing device 42 can also be controlled.

The steam conduits 44, 46, as well as the slat 45 of the thermal deicing device 42, are advantageously designed such that they withstand an internal overpressure of $\Delta pges = p_2 - p_4$.

Figure 8:
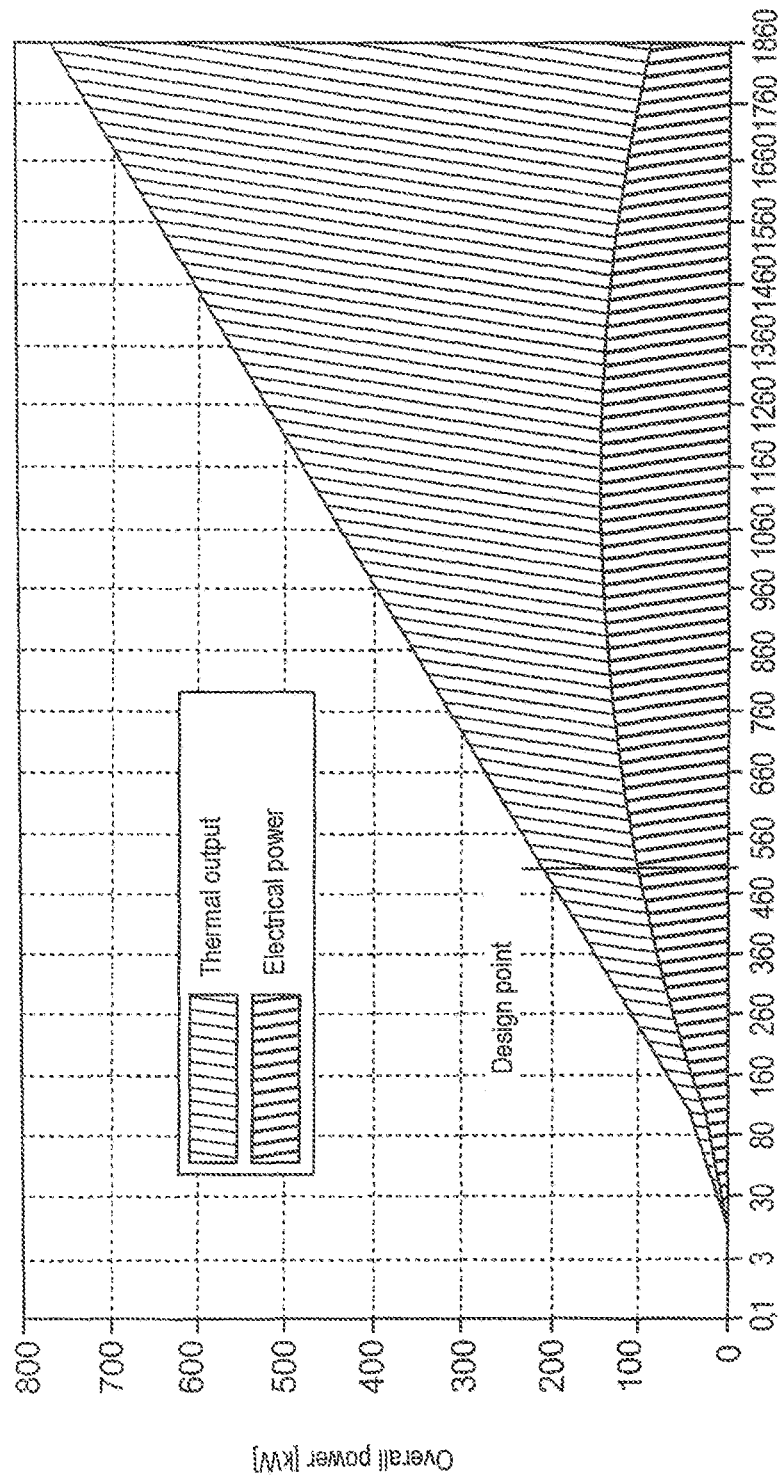
FIG. 8 respectively shows the amount of the thermal output and the electrical power of a PEM fuel cell in the form of a stacked area diagram.

Furthermore, the icing protection system 10 according to the invention may on the one hand use the evaporatively cooled fuel cell system 12 for utilizing the waste heat $\dot{Q}_{BZ}$ produced during its operation for the operation of the thermal deicing device 42 $\dot{Q}_{th}$ and on the other hand use the electrical power $P_{BZ}$ simultaneously generated by the fuel cell system 14 for an electric icing protection system 60 $P_{el}$; see FIG. 8. Such an electric icing protection system 60 may form an integral component of the icing protection system 10 controlled according to the invention. In this case, the electric icing protection system 60 forms the part of the icing protection system 10 controlled according to the invention in the aircraft that is supplied with electrical energy for the purpose of icing protection only. Measuring instruments or other devices situated on the aircraft therefore can be maintained ice-free by means of efficiently generated electrical energy.

The thermal output demand for the icing protection comprising the entire aircraft ($\dot{Q}_{th} + P_{el}$) results regardless of its altitude from a thermal output demand $\dot{Q}_{th}$ and an electrical heat output demand for the electric icing protection $P_{el}$. In this case, the thermal deicing device 42 with its enormous heat demand for the thermal wing deicing $\dot{Q}_{th}$ is decisive for the overall design of the icing protection system 10 according to the invention. The electric icing protection system 60 integrated into the icing protection system 10 is referred to the thermal deicing device 42 preferably designed in such a way that the heat output of the thermal deicing device $\dot{Q}_{th}$ and the heat output of the electric icing protection system 60 $P_{el}$ are adapted to the performance curves of the evaporatively cooled fuel cell system 12 regardless of the weather-related overall heat demand ($\dot{Q}_{th} + P_{el}$); see FIG. 7. The ratio between the thermal and the electrical capacity of the evaporatively cooled fuel cell system 12 is according to its design dependent on the proportion in size between the heat demand of the deicing device 42 and the connected electrical icing protection system 60 in accordance with:

$$P_{BZ}/\dot{Q}_{BZ} \sim P_{el}/\dot{Q}_{th}$$

Figure 7:
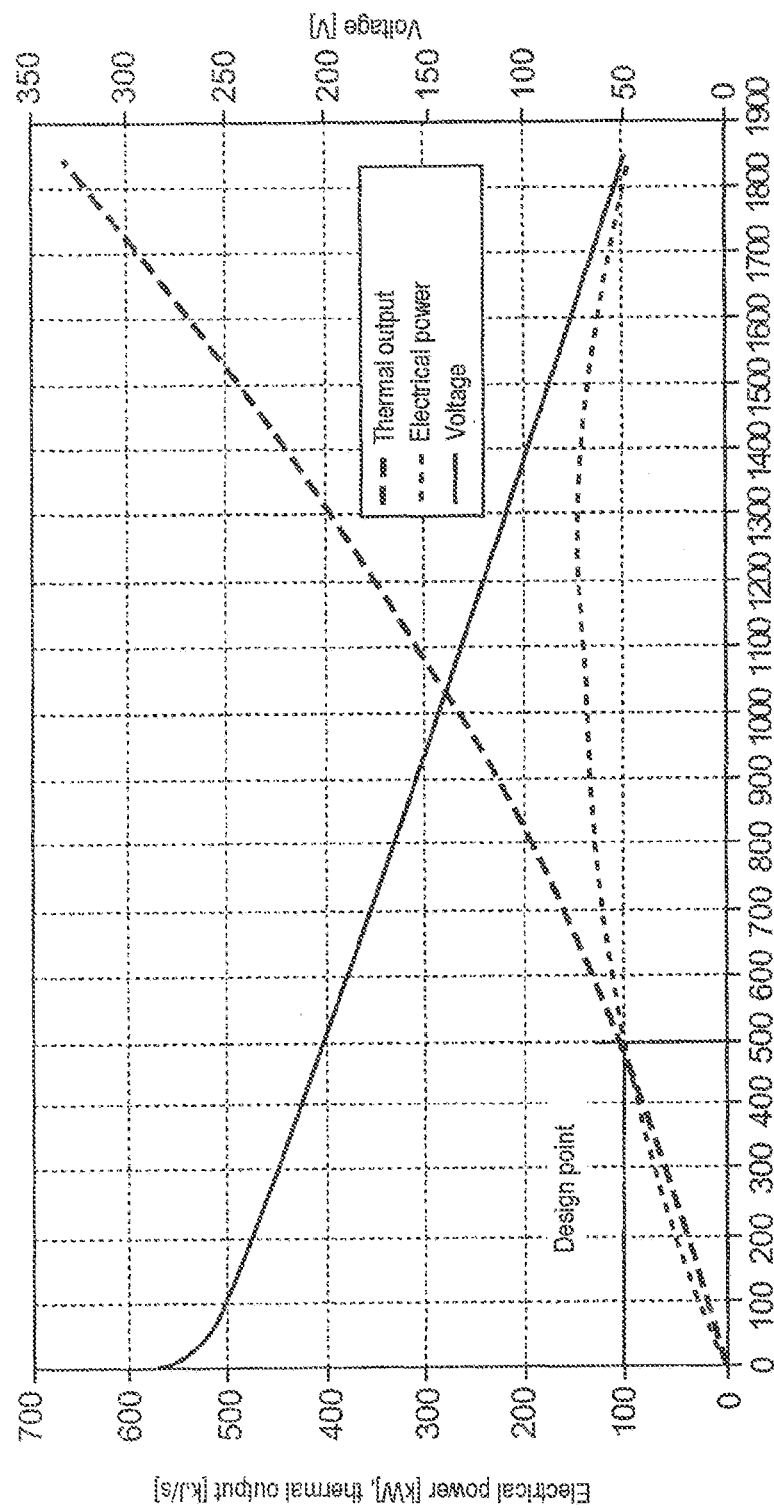
FIG. 7 shows a performance characteristic of a PEM fuel cell.

This can be decisively influenced by the design point of the evaporatively cooled fuel cell system 12 as elucidated in FIG. 7. The energy generation and the energy consumption are related, i.e., they are adapted to one another in accordance with the design regardless of the quantity of heat demanded by the thermal deicing device 42. The installed power of the fuel cell system 12 to be integrated can be determined in the form of:

$$\dot{Q}_{BZ} = \dot{Q}_{th}$$

According to FIG. 7, the electrical power and the thermal output of the fuel cell 14 may be assumed to be approximately identical at the design point:

$$P_{BZ}/\dot{Q}_{th} \approx 1.$$

During the operation at the design point of the evaporatively cooled fuel cell 14 that is elucidated with reference to the example in FIG. 7 and the following FIG. 8, the thermal and the electrical output are approximately identical. Consequently, the waste heat generation $\dot{Q}_{BZ}$ and the power generation $P_{BZ}$ of the evaporatively cooled fuel cell 14 likewise can maintain the entire aircraft ice-free because they are with respect to the system design adapted to the thermal deicing device 42 and the electrical icing protection system 60. Excess power incurred can be fed into the electrical energy storage device 37 or an on-board electrical system.

A first aspect of the invention is the initially described advantageous function of the icing protection system 10 according to the invention for the purposeful application in an aircraft, as well as a balanced design of integrated and combined subsystems, namely the combination of thermal deicing device 42 and electrical icing protection system 60.

A second aspect of the invention is the disclosure of a control for operating the icing protection system according to the invention.

The icing protection system 10 according to the invention is self-controlled. One advantage of the control according to the invention can be seen in that only as much heat as actually required for the deicing is delivered to the thermal deicing device 42. This results in an improved and fundamentally more efficient heat management.

During the condensation of water vapor, water vapor molecules collapse to approximately 0.0001-times their original volume while heat is simultaneously emitted, wherein this would in a closed space cause a vacuum manifesting itself in a pressure change that may be measured with the pressure measuring device. According to the present invention, however, this pressure change should be avoided by introducing new steam molecules into the closed space at a different location due to the evaporation of water.

According to the invention, the water vapor molecules collapsing due to the condensation caused by released heat should be compensated by once again evaporating water molecules. An evaporatively cooled fuel cell system 12 is provided for generating steam from liquid water for this purpose.

The evaporatively cooled fuel cell system 12 connected to the icing protection system 10 according to the invention utilizes "waste heat" that is incurred during the operation of the evaporatively cooled fuel cell system 12 as heat source for the wing deicing to be realized. Electrical energy is likewise generated during its operation and intermediately stored in a storage system 37 such as, for example, a battery.

Figure 4A:
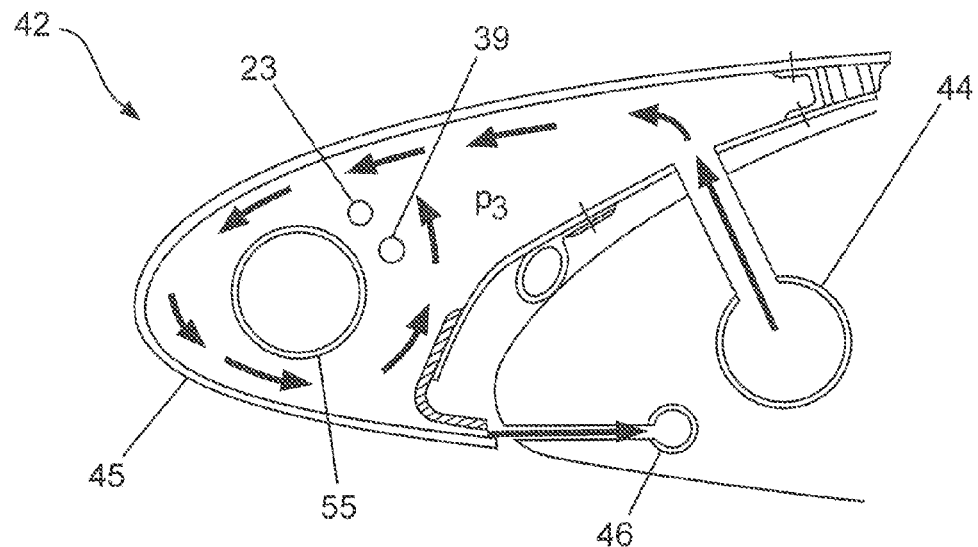
FIGS. 4a and 4b show an abstract representation of the respective section through a wing nose or a slat in the normal mode (4a) and in a flushing mode (4b).

FIG. 4a shows a closed system that is filled with a cooling medium vapor. The cooling medium is in a circuit that is symbolized by the circulating arrows and undergoes a constant change between the liquid and gaseous states of aggregation. A pressure $p_3$ acts in the closed system. The system boundary that is separated from the surroundings by a wall may be formed by regions of the skin of an aircraft, for example, in the area of the belly fairing or a wing profile 45 to be deiced. The heat withdrawn from the system is the heat flow $\dot{Q}_{ab}$ ($=\dot{Q}_{ab}$). The heat supplied to the system is the heat flow $\dot{Q}_{zu}$ ($=\dot{Q}_{bz}$); see FIG. 5.

The heat flow $\dot{Q}_{ab}$ emitted into the surroundings by the thermal deicing device 42 is calculated as follows:

$$\dot{Q}_{ab} = k \cdot A \cdot \Delta T,$$

wherein k is the heat transfer coefficient, A is the heat transfer surface and $\Delta T$ is the temperature gradient between the inside and the outside of the wall. The heat transfer coefficient k is calculated in accordance with:

$$1/k = 1/\alpha_{outside} + s/\lambda + 1/\alpha_{inside},$$

wherein s is the wall thickness, $\lambda$ is the coefficient of thermal conductivity and $\alpha$ is the heat transfer coefficient.

The emitted heat energy flow $\dot{Q}_{ab}$ varies in dependence on the environmental conditions of the aircraft. The intensity of the emitted heat energy flow $\dot{Q}_{ab}$ is influenced by environmental conditions such as, e.g., air density fluctuations, temperature fluctuations, changes in relative humidity, the flow speed of the air, possibly occurring rain, etc. All these factors influence the heat transfer coefficient k. While the heat transfer surface A and the temperature gradient $\Delta T$ are known, it is altogether difficult to determine the heat transfer coefficient k and to predict the withdrawn heat flow $\dot{Q}_{ab}$ but this is in accordance with the invention circumvented as described below.

Figure 5:
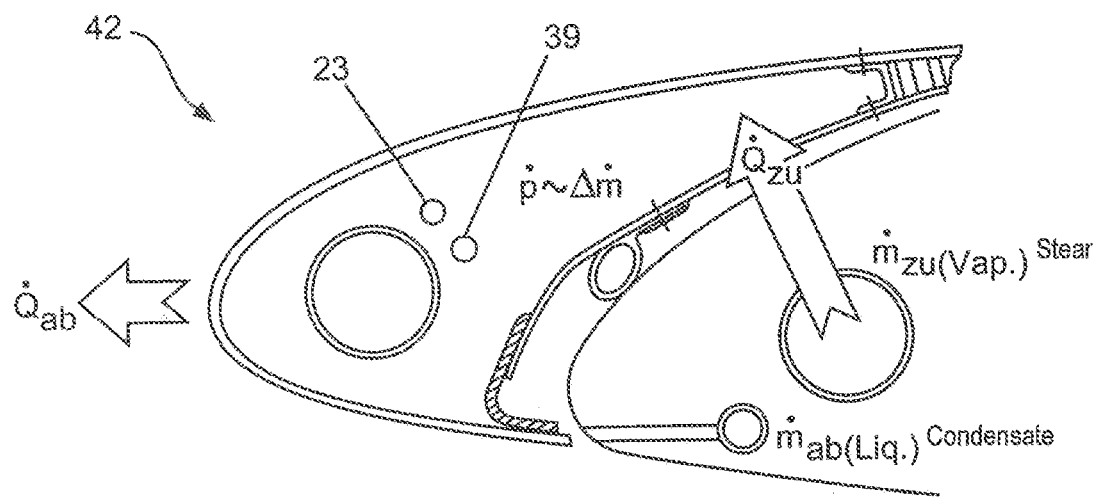
FIG. 5 elucidates the functional principle of the invention with reference to a slat that acts as a quasi-closed system under the influence of thermodynamic variables.

The entire process according to the present invention takes place in a quasi-closed system, wherein liquid medium condensed from vapor is continuously withdrawn and gaseous medium is continuously supplied to the system; see FIGS. 4a and 5. The steam mass balance, i.e., the mass flow difference in the gaseous phase, results thereof as follows:

$$\Delta \dot{m}_i = (\dot{m}_{i,zu} - \dot{m}_{i,ab}).$$

The heat balance likewise can be established for the steam as heat-transporting medium:

$$\Delta \dot{Q}_i = (\dot{Q}_{i,zu} - \dot{Q}_{i,ab}),$$

wherein $$\dot{Q}_{i,zu} = \dot{m}_{i,zu} \cdot \Delta h_v$$

is the heat flow introduced into the system due to evaporation and $$\dot{Q}_{i,ab} = \dot{m}_{i,ab} \cdot \Delta h_v$$

is the heat flow withdrawn from the system due to condensation on the wing nose 45. Collapsed steam molecules can be considered as withdrawn from the system. The steam mass flow $\dot{m}_{i,ab}$ withdrawn due to condensation of the gaseous phase results from the thermal output $\dot{Q}_{i,ab}$ emitted at the wing nose 45 in accordance with:

$$\dot{m}_{i,ab} = \dot{Q}_{i,ab} / \Delta h_v,$$

wherein $\Delta h_v$ is the evaporation enthalpy of the water. It indicates the quantity of heat ($\approx 2360$ kJ) transmitted to the iced surroundings on the wing nose 45 during the condensation of 1 kg water vapor.

Steam molecules that are additionally introduced into the system due to evaporation are considered as added to the system. The steam mass flow $\dot{m}_{i,zu}$ supplied to the system due to evaporation results from the thermal output $\dot{Q}_{i,zu}$ obtained due to the evaporative cooling of the evaporatively cooled fuel cell system 14 in accordance with:

$$\dot{m}_{i,zu} = \dot{Q}_{i,zu} / \Delta h_v.$$

Figure 9:
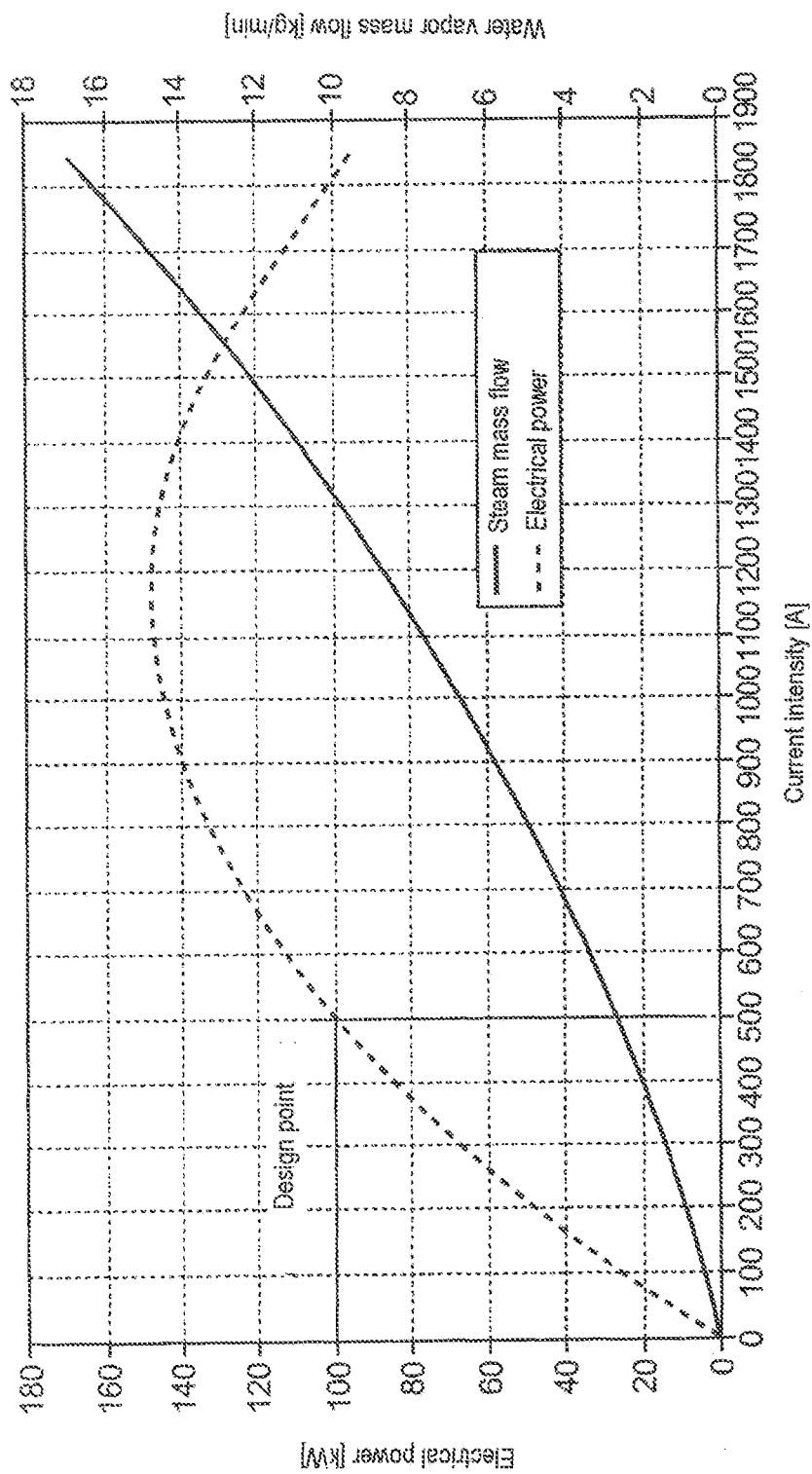
FIG. 9 shows the steam mass flow obtained from fuel cell waste heat together with the electrical power in dependence on the load current.

In this case, $\Delta h_v$ is the quantity of heat ($\approx 2360$ kJ) that 1 kg of liquid water can withdraw from the evaporatively cooled fuel cell 14 until it is completely evaporated; see FIG. 9.

With respect to a quasi-closed system, this makes it possible to establish an equation for the difference between evaporation heat output and condensation heat output, i.e., the difference between the thermal output introduced into the system and the thermal output emitted into the environment:

$$\Delta \dot{Q}_i = \Delta \dot{m}_i \cdot \Delta h_v.$$

Since evaporation and condensation are reverse operations, the evaporation enthalpy $\Delta h_v$ is respectively identical. The evaporation of 1 kg water requires the same amount of energy as that released during the condensation of 1 kg water vapor. Consequently, the following applies:

$$\Delta \dot{Q}_i \sim \Delta \dot{m}_i.$$

The table illustrated in FIG. 10 respectively shows the mass-related specific volume of water vapor in the saturated state (wet steam), the mass-related specific volume of condensed water, as well as the volume fraction of the condensed water in comparison with that of wet steam in dependence on the flight altitude of an aircraft. If water is evaporated at sea level, the water vapor being created has 1603-times the volume of the previously liquid water; at a flight altitude of 12,192 m, it even amounts to 7552-times the aforementioned volume. Exactly the opposite occurs during a condensation because the water vapor molecules collapse to a fraction of their previous volume in the gaseous phase. During the condensation of water vapor, water vapor molecules respectively collapse to $\frac{1}{1603}$ and $\frac{1}{7552}$ of their original volume while heat is simultaneously emitted. At an exemplary ambient pressure of 0.1992 bar at a typical cruising altitude of 12,192 m, water vapor with a mass of 1 kg and a volume of approximately 7.682 m$^3$ would after the condensation only have a volume of 0.0010172 m$^3$. This corresponds to a volume fraction of approximately 0.001 or 0.01%. Since the 0.01% volume fraction of the liquid water is infinitesimal in comparison with the 99.99% volume fraction of the water present in gaseous form, it is neglected in the following considerations. The gaseous phase of the water is primarily considered below.

Vapors basically behave like gases. In the gaseous phase of a closed space filled with water vapor, the thermal state equation of the gases applies:

$$p \cdot V = m \cdot R \cdot T.$$

In this case, p is the pressure in the closed system, V is the volume defined by the structural space, m is the steam mass, R is the special gas constant of the water vapor and T is the temperature within a closed system. According to the invention, the following approach may form the basis for the gaseous phase of the water in the presently quasi-closed space:

$$\dot{p}_i \sim \Delta \dot{m}_i$$

It should now be possible to determine the mass flow difference in the gaseous Phase $$\Delta \dot{m}_i = (\dot{m}_{i,zu} - \dot{m}_{i,ab})$$

in the quasi-closed system by measuring the pressure over the time $\dot{p}_i$ in accordance with the following correlation:

$$\dot{p}_i \cdot V = \Delta \dot{m}_i \cdot R \cdot T.$$

The volume V, the gas constant R and the temperature T are assumed to be constant. The volume is defined by the geometry. Changes in states of aggregation generally take place at a constant temperature. The presently described process also should take place at a predetermined constant temperature. According to the invention, the pressure change $\dot{p}_i$ measured in the gaseous phase can be determined with a pressure measuring device 23 installed in the quasi-closed system; see FIG. 5. The mass flow difference in the gaseous phase $\Delta \dot{m}_i$ is composed of the steam mass flow $\dot{m}_{i,zu}$ supplied to the system due to evaporation and the negative steam mass flow $\dot{m}_{i,ab}$ withdrawn from the gaseous phase due to condensation. The steam mass flow supply is realized due to evaporation in the cooling conduits 17 of the evaporatively cooled fuel cell 14; the steam mass flow withdrawal is realized due to condensation on the wing nose 45. A pressure increase occurs if the steam mass flow supply is greater than the steam mass flow withdrawal. A pressure drop occurs if the steam mass flow withdrawal is greater than the steam mass flow supply. No pressure change $\dot{p}_i$ occurs if the steam supply and the steam withdrawal are in equilibrium.

According to $$\Delta \dot{m}_i \sim \dot{p}_i \sim \Delta \dot{m}_i$$

the modified gas equation $$\Delta \dot{m}_i = (\dot{p}_i \cdot V)/(R \cdot T)$$

ultimately can be combined with the equation for the difference between evaporation heat output and condensation heat output $$(\dot{Q}_{i,zu} - \dot{Q}_{i,ab}) = \Delta \dot{m}_i \cdot h_v$$

as follows:

$$(\dot{Q}_{i,zu} - \dot{Q}_{i,ab}) = (\dot{p}_i \cdot V \cdot h_v)/(R \cdot T).$$

Due to the laws of gas dynamics and pulse transmission on a molecular level, the pressure change $\dot{p}_i$ between the change of the thermal output emitted on the wall $\dot{Q}_{i,ab}$ and the thermal output of the fuel cell to be supplied is transmitted as a result of generated electrical power $P_{BZ}$.

The power generation, i.e., the "boosting" of the fuel cell reaction in the fuel cell 14, is achieved due to the fact that current is drained from the fuel cell 14, i.e., a current flow is ensured. This is achieved with a current draining and current conditioning device 15 of the fuel cell 14 that is realized, for example, in the form of power electronics. $P_{BZ}$ is the electrical power demanded from the evaporatively cooled fuel cell system 12 by the current draining and current conditioning device 15.

When the fuel cell illustrated in the examples according to FIGS. 7 and 8 is operated at the design point, the generated electrical power of the fuel cell $P_{BZ}$ approximately corresponds to the thermal output $\dot{Q}_{i,BZ}$ generated by the fuel cell, wherein the generated thermal output of the fuel cell $\dot{Q}_{i,BZ}$ likewise is the thermal output $\dot{Q}_{i,zu}$ supplied to the evaporative cooling system:

$$P_{BZ} \approx \dot{Q}_{i,BZ} = \dot{Q}_{i,zu}.$$

If an icing protection system 10 according to the invention is operated in equilibrium at a certain NOMINAL pressure $p_3$ that was described in greater detail above, the heat flow $\dot{Q}_{i,zu}$ supplied by the evaporatively cooled fuel cell system 12 should, according to the invention, correspond to the heat flow $\dot{Q}_{i,ab}$ withdrawn at the thermal deicing device 42:

$$\dot{Q}_{i,ab} \equiv \dot{Q}_{i,zu} \approx P_{BZ}.$$

The previously unknown heat flow $\dot{Q}_{i,ab}$ can be fed back to the thermal output difference $\Delta \dot{Q}_i$ with the aid of a closed control circuit and read based on the electrical power generation of the fuel cell 14 $P_{BZ}$:

$$\dot{Q}_{i,ab} \approx P_{BZ} - ((\dot{p}_{i,3} \cdot V \cdot \Delta h_v)/(R \cdot T)).$$

The present invention therefore provides a way for enabling the pressure p(t) to allow a communication to take place between the unknown heat flow $\dot{Q}_{i,ab}$ absorbed by the surroundings and the heat flow $\dot{Q}_{i,zu}$ to be determined.

According to FIG. 4a, the pressure $p_3$ therefore is used as controlled variable for the control of the icing protection system 10 according to the invention.

The control of the icing protection system 10 according to the invention therefore is altogether aimed at determining the electrical power $P_{BZ}$ demanded from the evaporatively cooled fuel cell system 12, at which an equilibrium between the withdrawn heat flow $\dot{Q}_{i,ab}$ and the supplied heat flow $\dot{Q}_{i,zu}$ is adjusted at a predetermined pressure p(t).

Figure 4B:
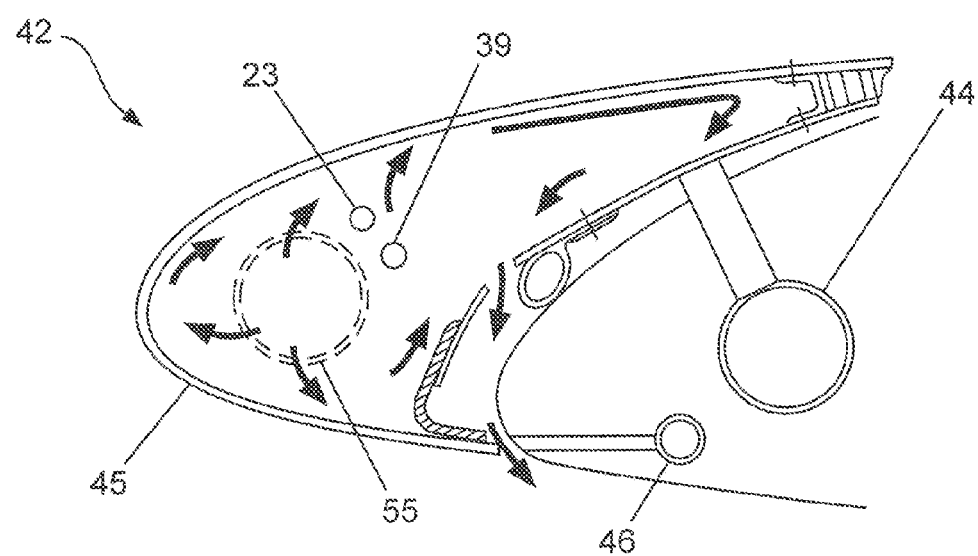

FIG. 4a shows the normal operation with water vapor while FIG. 4b is intended to illustrate an air flushing cycle. In FIG. 4a, the arrows shown symbolize water vapor while air, e.g., in the form of engine bleed air is symbolized by the arrows in FIG. 2b. The flushing device 55 realized, for example, in the form of a piccolo tube is illustrated in the closed state in FIG. 4a; in FIG. 4b, the flushing device 55 is opened such that air can escape and flush the slat 45 from inside. According to FIG. 4b, the flushing air escapes into the surroundings on the underside of the wing nose. The pressure $p_3$ only acts in the evaporative cooling system, however, not during flushing.

Figure 6:
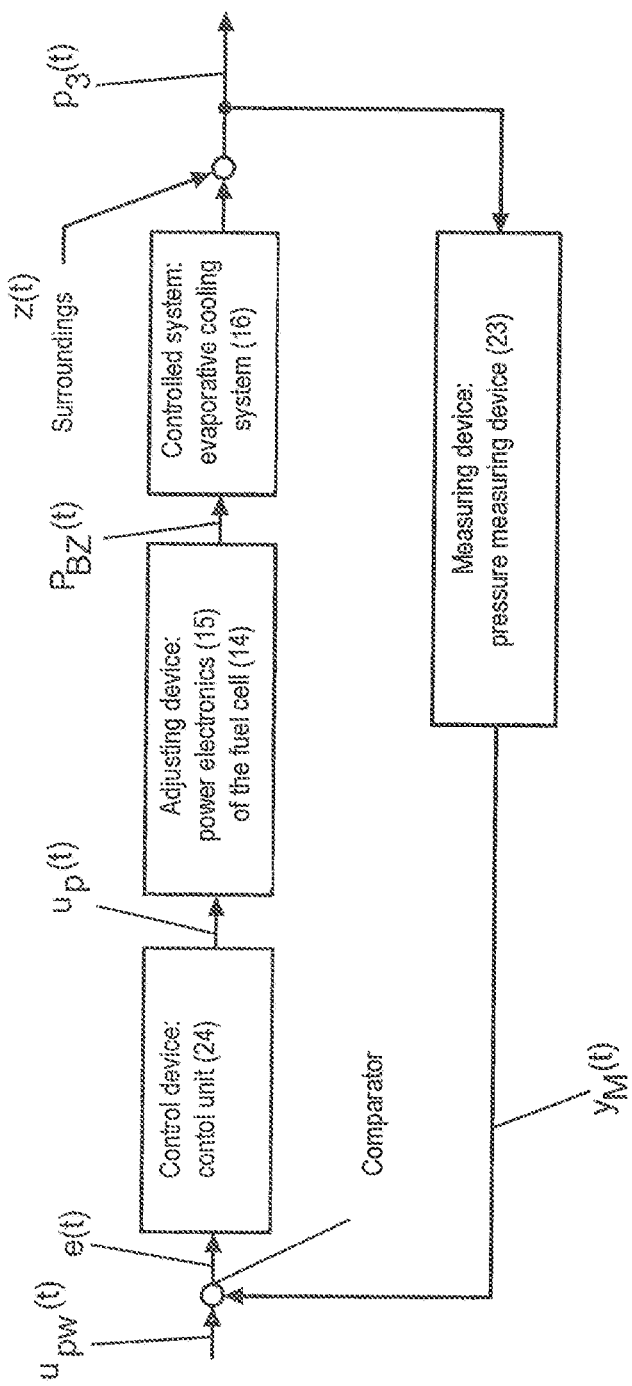
FIG. 6 shows a schematic representation of a control circuit.

According to the invention, the electrical power $P_{BZ}$ demanded from the evaporatively cooled fuel cell system 12 is in the sense of a control adjusted such that an equilibrium between the withdrawn heat flow $\dot{Q}_{i,ab}$ and the supplied heat flow $\dot{Q}_{i,zu}$ is at a predetermined pressure $p_3$ (see FIG. 2) adjusted in the evaporative cooling system 16; see FIG. 4a and FIG. 6. For this purpose, the icing protection system 10 according to the invention comprises a pressure measuring device 23 and a control unit 24. The control unit 24 triggers a request for thermal energy to be provided in the evaporatively cooled fuel cell system 12 in response to a corresponding signal that is transmitted to the control unit 24 by the pressure measuring device 23. The fuel cell system 12 responds to the request for thermal energy by "boosting" the fuel cell reaction such that the power generation and therefore the heat generation are likewise increased. The increased heat generation in turn causes an increased steam development of the thermal medium as elucidated in FIG. 9. The thermal energy stored in the steam is made available to the thermal deicing device 42 for the thermal deicing process by routing steam into the regions to be deiced. FIG. 6 shows a simplified control circuit, in which the following signal designations are used.

$u_{pw}(t)$ respectively represents the command variable or a signal that is characteristic for the NOMINAL pressure $p_3$. e(t) is the deviation and a signal that is characteristic for the measured pressure p(t). $u_p(t)$ is an output signal of the control unit 24 and represents the output variable. The deviation e(t) is the difference between the command variable $u_{pw}(t)$ and the output variable $u_p(t)$. $P_{BZ}(t)$ is still the relevant manipulated variable and indicates the power $P_{BZ}$ demanded from the fuel cell 14. z(t) is a disturbance variable and dependent on the ambient conditions of the aircraft (e.g., $p_4$, $T_4$, Re, etc.). The controlled variable y(t) is equivalent to the pressure $p_3(t)$, i.e., the ACTUAL pressure $p_3$ in the steam conduits 44 and 46, as well as in the slat 45. $y_M(t)$ is a measured variable and represents the ACTUAL pressure $p_3$ in the form of a characteristic signal from the device 23 for measuring the pressure.

FIG. 7 shows a qualitative illustration of a performance characteristic of a low-temperature PEM fuel cell and elucidates how the electric voltage U within the fuel cell 14 drops as the current drain I increases, wherein the electrical power $P_{el}$ results from the product of electric voltage U and electric current intensity I. FIG. 7 elucidates the dependence of the electrical power $P_{BZ}$ and the voltage U on the current intensity I. The generation of the electrical power $P_{BZ}$ therefore takes place due to the demanded current intensity only, namely by causing a current flow by any connected electrical consumer. The intensity of the current flow may be controlled by the current draining and current conditioning device 15 of the fuel cell 14 that is realized, for example, in the form of power electronics comparably to charging conventional accumulators.

The output signal $u_p(t)$ of the control unit 24 instructs the power electronics 15 of the fuel cell 14 to demand a current corresponding to the manipulated variable $P_{BZ}(t)$ from the fuel cell 14. The demanded current flow results in electrical power, fuel cell reaction heat and evaporating cooling medium as a result thereof. The desired pressure $p_3$ is adjusted.

FIG. 7 elucidates that the generated electrical power $P_{BZ}$ of the fuel cell 14 also increases as the current flow increases while the voltage in the fuel cell 14 drops. The fuel cell reaches its power maximum $P_{max}$ at a limiting current intensity $I_{Grenz}$. If the current intensity is further increased beyond the limiting current intensity $I_{Grenz}$, the electrical power $P_{BZ}$ of the fuel cell 14 begins to drop.

In instances, in which the fuel cell 14 is supplied with the oxidation medium air by means of an electrically operated air compressor and/or the fuel supplied to the fuel cell 14 is produced by a fuel conditioning system, a system-related separate demand for electrical power, for example, of 25% may apply. In addition to the thermal output portion, only the electrical net nominal power Pnet generated by the fuel cell 14 accordingly would be available as electrical portion $P_{el}$ for the icing protection.

FIG. 11 ultimately shows a sectional representation of an evaporatively cooled fuel cell 14 that is connected to an evaporative cooling system 16 and comprises cooling conduits 17.

This figure shows the conventional stack design of the fuel cell that in this case is integrated into a pressure vessel designed, for example, for an absolute pressure $p_2$ of 6 bar. The illustration furthermore shows the part of the evaporative cooling system 16 that comprises the pressurized space $p_2$, the pressure measuring device 21 and the temperature measuring device 38, as well as connections for supplying mediums and cooling fluid to the fuel cell. The connections on the upper side of the pressure vessel are intended for withdrawing steam from the evaporatively cooled fuel cell 14 while the power cables shown are intended for connecting the current draining and current conditioning device 15.

As a supplement, it should be noted that "comprising" does not exclude any other elements or steps, and that "a" or "an" does not exclude a plurality. It should furthermore be noted that characteristics that were described with reference to one of the above exemplary embodiments can also be used in combination with other characteristics of other above-described exemplary embodiments. Reference symbols in the claims should not be interpreted in a restrictive sense.

REFERENCE SYMBOLS

10 Icing protection system
12 Evaporatively cooled fuel cell system
14 Evaporatively cooled fuel cell
15 Current draining and current conditioning device
16 Evaporative cooling system
17 Cooling conduits
18 Pump
20 Cooling medium tank
21 Pressure measuring device
22 Pressure measuring device
23 Pressure measuring device
24 Control unit
25 System for generating fuel cell operating pressure
26 Aftercondenser
28 Steam outlet conduit
30 Condensate collection area/condensate diverter
32 Steam release valve
35 Process water withdrawal device
36 Temperature measuring device
37 Storage system
38 Temperature measuring device
39 Temperature measuring device
40 Valve
42 Thermal deicing device
44 Steam conduit
45 Wing nose/slat
46 Condensate and wet steam conduit
48 Pressure control valve
50 Pressure control valve
51 Throttling element
52 Telescopic tube
53 Engine bleed air conduit
54 Flexible tube connection
55 Flushing device
56 Water vapor supply system
58 Engine
59 Engine bleed air valve
60 Electric icing protection system/device
Formula Symbols
T Temperature [° C.], [K]
$\Delta$T Temperature gradient [° C.], [K]
t Time [s]
$\Delta$t Time period [s]
P Electrical power [W]
P·t Electrical energy [Ws], [J]
Q Heat quantity, thermal energy [Ws], [J]
$\dot{Q}$ Heat flow, thermal output [J/s], [W]
$\Delta \dot{Q}$ Thermal output difference (evaporation–condensation) [J/s], [W]
m Mass [kg]
$\Delta \dot{m}$ Steam mass flow difference [kg/s]
$\dot{m}$ Steam mass flow [kg/s]
$\Delta h_v$ Evaporation enthalpy [kJ/kg]
$\dot{p}$ Pressure change [Pa/s], [bar/s]
p Pressure [Pa], [bar]
p(t) Pressure as a function of the time [Pa], [bar]
$\Delta$p Pressure difference, pressure deviation [Pa], [bar]
k Heat transfer coefficient [W/(m² K)]
$\alpha$ Heat transfer coefficient [W/(m² K)]
$\lambda$ Coefficient of thermal conductivity [W/(m K)]
s Wall thickness [m]
A Heat transfer surface [m²]
V Volume in pressurized space [m³]
R Specific gas constant [kJ/kg K]
Re Reynolds-number
I Current intensity [A]
U Voltage [V]
Indices
1 Referred to pressurized space
2 Referred to pressurized space
3 Referred to pressurized space
A In the surroundings
BZ Referred to the fuel cell
BZ* In the fuel cell
zu Supplied
ab Emitted
el Electrical
th Thermal skin On the aircraft skin
ges Overall
Grenz Limit
max Maximal
net Net

The invention claimed is:

1. An icing protection system, comprising:
a fuel cell;
an evaporative cooling system,
a thermal deicing device with a condenser and steam conduits for supplying steam into the condenser,
a control unit, and
a device adapted to measure a pressure in the steam conduits and positioned in a wing nose,
   wherein the evaporative cooling system is in thermal contact with the fuel cell to conduct heat from the fuel cell to the evaporative cooling system for the evaporation of a cooling medium and to route the evaporated cooling medium to the condenser via the steam conduits,
   wherein the condenser is configured to condense the cooling medium evaporated during the operation of the fuel cell to cool the fuel cell while simultaneously emitting heat in the region to be deiced, and
   wherein the control unit is configured to control the electrical power demanded from the evaporatively cooled fuel cell in dependence on a deviation of the pressure in the steam conduits measured with the pressure measuring device from a predetermined nominal pressure in such a way that the thermal cooling capacity of the evaporative cooling system of the evaporatively cooled fuel cell corresponds to the condensation capacity of the thermal deicing device.

2. The icing protection system of claim 1, wherein the condenser is formed by at least a section of a wing nose.

3. The icing protection system of claim 1, further comprising an electric icing protection system that is configured to receive electricity generated by the fuel cell system.

4. The icing protection system of claim 3, wherein the electrical output of the electric icing protection system correlates with the thermal output of the thermal deicing device.

5. The icing protection system of claim 1, wherein the cooling medium comprises water.

6. The icing protection system of claim 5, further comprising a closable air inlet connected to the steam conduits to selectively flush the steam conduits and remove steam.

7. The icing protection system of claim 6, wherein the air inlet is connected to a bleed air conduit of an engine.

8. A method of operating an icing protection system with a fuel cell, an evaporative cooling system and a thermal deicing device with a condenser, wherein the evaporative cooling system is in thermal contact with the fuel cell to conduct heat from the fuel cell to the evaporative cooling system for the evaporation of a cooling medium and to route the evaporated cooling medium to the condenser via the steam conduits, and wherein the condenser is configured to condense the cooling medium evaporated during the operation of the fuel cell to cool the fuel cell while simultaneously emitting heat in the region to be deiced, the method comprising:

measuring, by a pressure measuring device in a wing nose, a pressure in steam conduits, the steam conduits being used for supplying steam to regions to be deiced; and
controlling, by a control unit, an electrical power demanded from the fuel cell, wherein said controlling comprises adjusting the electrical power demanded from the evaporatively cooled fuel cell in dependence on a deviation of the pressure measured in the steam conduits with the pressure measuring device from a predetermined nominal pressure, and
wherein the electrical power demanded from the fuel cell is controlled in such a way that the thermal cooling capacity of the evaporative cooling system of the evaporatively cooled fuel cell corresponds to the condensation capacity of the thermal deicing device.

9. The method of claim 8, wherein the steam mass flow supplied to the evaporative cooling system of the evaporatively cooled fuel cell due to evaporation and the steam mass flow lost at the thermal deicing device due to condensation are in equilibrium.

10. The method of claim 8, wherein the steam mass flow supplied to the evaporative cooling system of the evaporatively cooled fuel cell is controlled in dependence on the steam mass flow lost at the thermal deicing device by a change in the pressure in the steam conduits.

11. The method of claim 8, wherein the electric current generated by the evaporatively cooled fuel cell system is fed to an electric icing protection system.

12. The method of claim 8, furthermore comprising flushing the steam conduits to remove steam.

13. An aircraft with an icing protection system in a wing nose, the icing protection system comprising:
a fuel cell;
an evaporative cooling system,
a thermal deicing device with a condenser and steam conduits for supplying steam into the condenser,
a control unit, and
a device arranged in the wing nose and adapted to measure the pressure in the steam conduits,
   wherein the evaporative cooling system is in thermal contact with the fuel cell in order to conduct heat from the fuel cell to the evaporative cooling system for the evaporation of a cooling medium and to route the evaporated cooling medium to the condenser via the steam conduits,
   wherein the condenser is configured to condense the cooling medium evaporated during the operation of the fuel cell in order to cool the fuel cell while simultaneously emitting heat in the region to be deiced, and
   wherein the control unit is configured to control the electrical power demanded from the evaporatively cooled fuel cell in dependence on a deviation of the pressure in the steam conduits measured with the pressure measuring device from a predetermined nominal pressure in such a way that the thermal cooling capacity of the evaporative cooling system of the evaporatively cooled fuel cell corresponds to the condensation capacity of the thermal deicing device.

* * * * *